US012720534B2

(12) United States Patent
Maamari et al.

(10) Patent No.: US 12,720,534 B2
(45) **Date of Patent: *Aug. 25, 2026**

(54) VISIBLE INTERRUPTION LENGTH CONSIDERATIONS FOR CONFIGURED GRANT TRANSMISSION OCCASIONS

(71) Applicant: QUALCOMM Incorporated, San Diego, CA (US)

(72) Inventors: Diana Maamari, San Diego, CA (US); Huilin Xu, Temecula, CA (US); Linhai He, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 18/442,921

(22) Filed: Feb. 15, 2024

(65) Prior Publication Data

US 2025/0267651 A1 Aug. 21, 2025

(51) Int. Cl.

*H04W 4/00* (2018.01)
*H04W 72/1268* (2023.01)
*H04W 72/21* (2023.01)
*H04W 74/00* (2009.01)

(52) U.S. Cl.

CPC ....... *H04W 72/1268* (2013.01); *H04W 72/21* (2023.01); *H04W 74/004* (2013.01); *H04W 74/006* (2013.01)

(58) Field of Classification Search

None

See application file for complete search history.

(56) References Cited

U.S. PATENT DOCUMENTS 12,568,361 B2 * 3/2026 Christoffersson ... H04W 12/041
2023/0291451 A1 * 9/2023 Su ........................ H04B 7/0626
2023/0292320 A1 * 9/2023 Yang ..................... H04L 1/1854
2023/0319819 A1 * 10/2023 Wang ................ H04W 72/1268 370/336
2024/0147478 A1 * 5/2024 Babaei .................. H04W 72/21

(Continued)

FOREIGN PATENT DOCUMENTS

WO WO-2024229813 A1 * 11/2024 ............ H04W 72/21
WO WO-2026035634 A1 * 2/2026 ........ H04W 28/0268

OTHER PUBLICATIONS

3GPP TSG-RAN WG1 Meeting #113 Incheon, Korea, May 22-26, 2023 R1-2306086 (Year: 2023).*

*Primary Examiner* — Bob A Phunkulh

(74) *Attorney, Agent, or Firm* — Holland & Hart LLP

(57) ABSTRACT

Methods, systems, and devices for wireless communications are described. The techniques herein relate to visible interruption length considerations for configured grant (CG) transmission occasions (TOs). A user equipment (UE) receives a control message indicating a CG configuration, the CG configuration includes multiple uplink TOs within a time period. The UE transmits, using at least one of the multiple uplink TOs in accordance with the CG configuration, an uplink control information message including an indication of a quantity of unused uplink TOs of the multiple uplink TOs. The indication excludes one or more invalid uplink TOs that correspond to one or more uplink TOs of the plurality uplink TOs that at least partially overlap with one or more interruption durations associated with a measurement duration.

18 Claims, 11 Drawing Sheets

(56) References Cited

U.S. PATENT DOCUMENTS

| | | | | |
|---|---|---|---|---|
| 2024/0155573 | A1* | 5/2024 | Yang | H04W 72/115 |
| 2024/0276305 | A1* | 8/2024 | Khoshkholgh Dashtaki | H04L 1/1854 |
| 2024/0381343 | A1* | 11/2024 | Yin | H04W 72/1268 |
| 2024/0381344 | A1* | 11/2024 | Yin | H04L 1/1812 |
| 2024/0381358 | A1* | 11/2024 | Yin | H04L 5/0078 |
| 2025/0039853 | A1* | 1/2025 | Yin | H04W 72/1268 |
| 2025/0220668 | A1* | 7/2025 | Jose | H04W 72/20 |
| 2025/0227690 | A1* | 7/2025 | Maamari | H04L 5/14 |
| 2025/0294562 | A1* | 9/2025 | Lee | H04W 72/21 |
| 2026/0046067 | A1* | 2/2026 | Bae | H04L 1/08 |

* cited by examiner

400

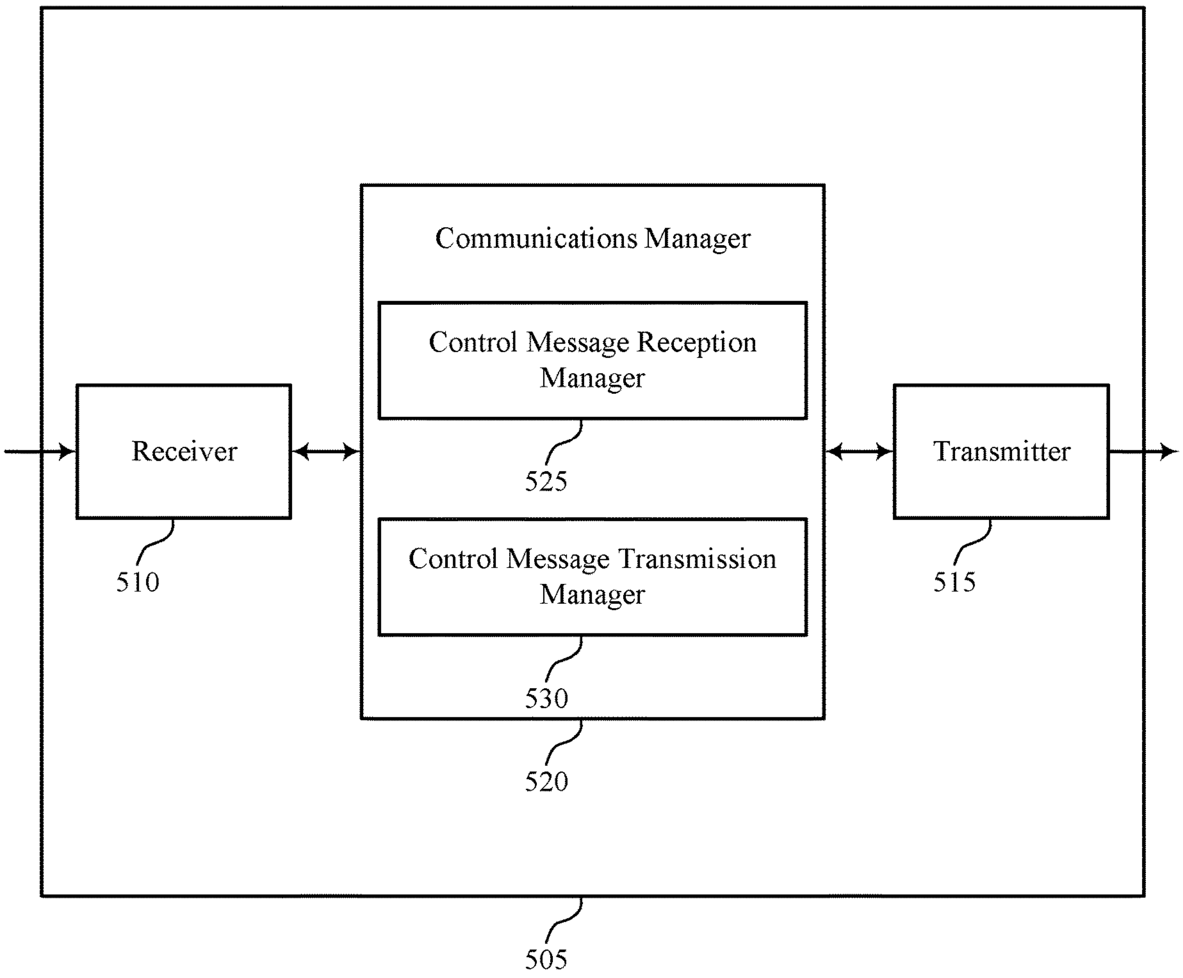
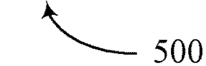
FIG. 5

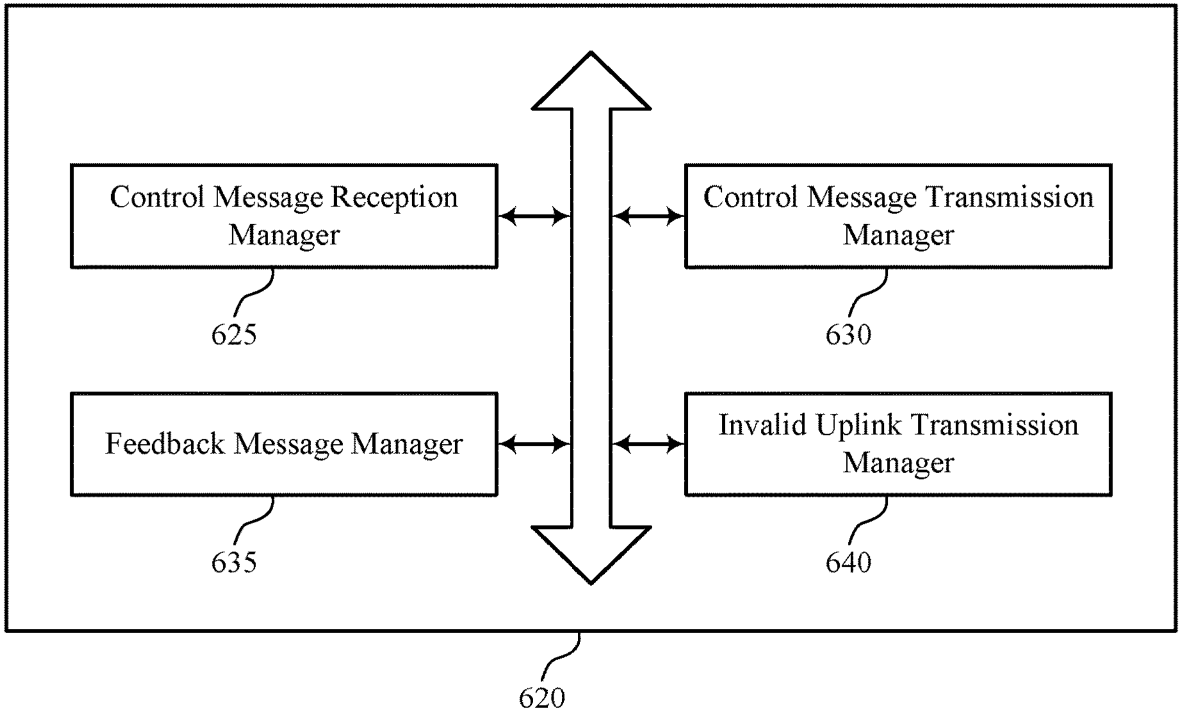
FIG. 6

Receive a control message indicating a configured grant configuration, the configured grant configuration comprising a plurality of uplink transmission occasions within a time period

805

Transmit, using at least one of the plurality of multiple uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that correspond to one or more uplink transmission occasions of the plurality that at least partially overlap with one or more interruption durations associated with a measurement duration

810

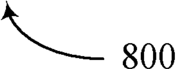

FIG. 8

Figure 9:
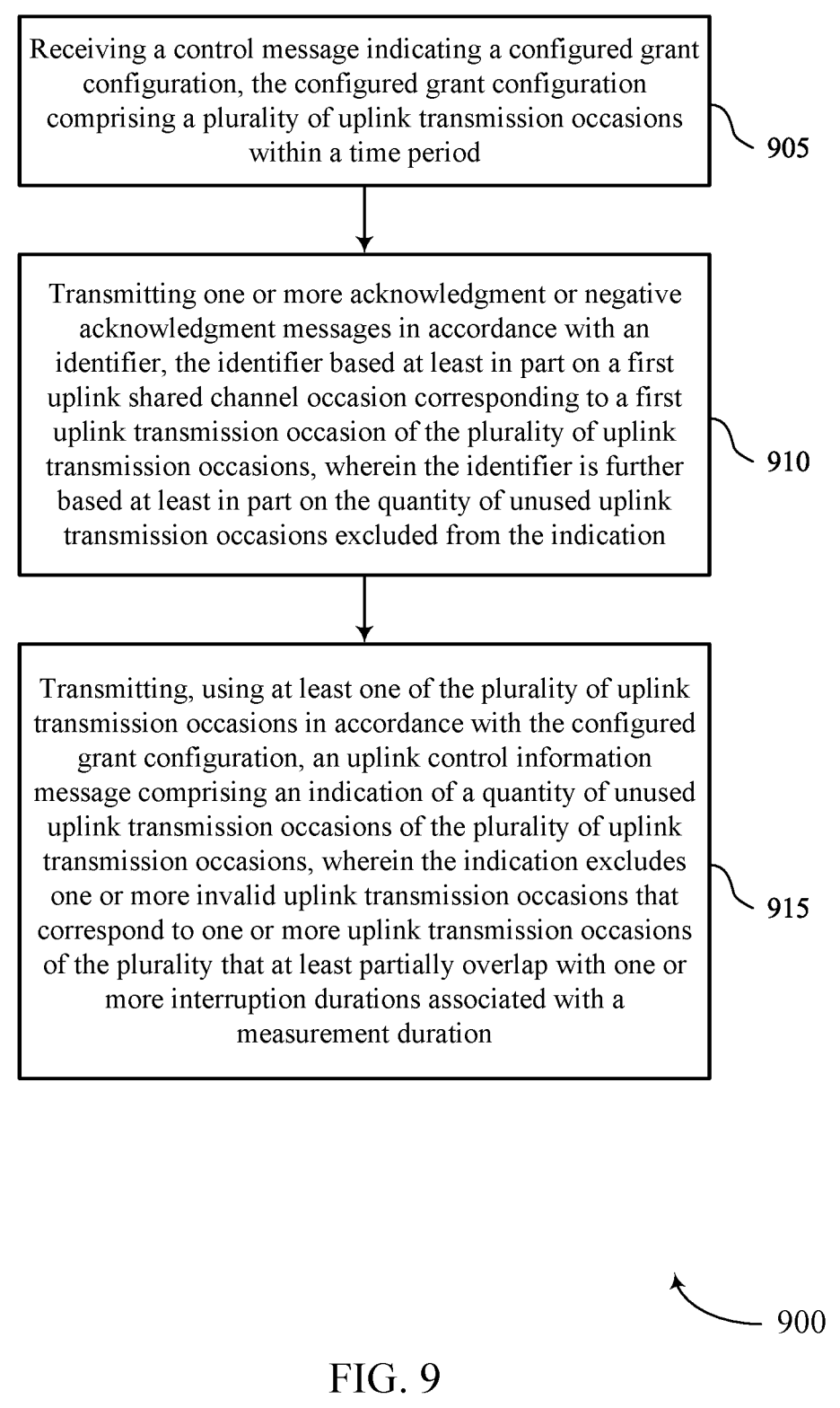

Receiving a control message indicating a configured grant configuration, the configured grant configuration comprising a plurality of uplink transmission occasions within a time period

905

Transmitting one or more acknowledgment or negative acknowledgment messages in accordance with an identifier, the identifier based at least in part on a first uplink shared channel occasion corresponding to a first uplink transmission occasion of the plurality of uplink transmission occasions, wherein the identifier is further based at least in part on the quantity of unused uplink transmission occasions excluded from the indication

910

Transmitting, using at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that correspond to one or more uplink transmission occasions of the plurality that at least partially overlap with one or more interruption durations associated with a measurement duration

VISIBLE INTERRUPTION LENGTH CONSIDERATIONS FOR CONFIGURED GRANT TRANSMISSION OCCASIONS

FIELD OF TECHNOLOGY

The following relates to wireless communications, including visible interruption length considerations for configured grant transmission occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support visible interruption length (VIL) considerations for configured grant (CG) transmission occasions (TOs). In some aspects, the described techniques provide for efficiently reducing overhead associated with signaling an indication of unused TOs. For example, the UE may receive a control message indicating a CG configuration that is associated with multiple uplink physical uplink shared channel (PUSCH) TOs. The UE may define one or more of the PUSCH TOs that collide with (e.g., at least partially overlap with) one or more visible interruption lengths (VILs) (e.g., interruption periods) as invalid. By defining the colliding PUSCH TOs as invalid, the UE may remove bits that would otherwise be used to indicate such PUSCH TOs in uplink control information (UCI) as unused TOs (e.g., via an unused TO indicated by uplink control information (UTO-UCI)), thereby reducing a size of the UCI message and reducing signaling overhead. Put another way, the UTO-UCI may exclude one or more uplink TOs that at least partially overlap with a VIL. Further, a UE may exclude such invalid occasions when determining a hybrid automatic repeat request (HARQ) identifier (ID) of one or more feedback processes to increase an efficiency in HARQ ID management.

A method for wireless communication by a user UE is described. The method may include receiving a control message indicating a CG configuration, the CG configuration including a set of multiple uplink TOs within a time period and transmitting, using at least one of the set of multiple uplink TOs in accordance with the CG configuration, an UCI message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

A UE for wireless communication is described. The UE may include one or more memories storing processor executable code, and one or more processors coupled with the one or more memories. The one or more processors may individually or collectively be operable to execute the code to cause the UE to receive a control message indicating a CG configuration, the CG configuration including a set of multiple uplink TOs within a time period and transmit, using at least one of the set of multiple uplink TOs in accordance with the CG configuration, an UCI message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

Another UE for wireless communication is described. The UE may include means for receiving a control message indicating a CG configuration, the CG configuration including a set of multiple uplink TOs within a time period and means for transmitting, using at least one of the set of multiple uplink TOs in accordance with the CG configuration, an UCI message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

A non-transitory computer-readable medium storing code for wireless communication is described. The code may include instructions executable by one or more processors to receive a control message indicating a CG configuration, the CG configuration including a set of multiple uplink TOs within a time period and transmit, using at least one of the set of multiple uplink TOs in accordance with the CG configuration, an UCI message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

Some examples of the method, UEs, and non-transitory computer-readable medium described herein may further include operations, features, means, or instructions for transmitting one or more acknowledgment or negative acknowledgment messages in accordance with an ID, the ID may be based on a first uplink shared channel occasion corresponding to a first uplink TO of the set of multiple uplink TOs, where the ID may be further based on the quantity of unused uplink TOs excluded from the indication.

Some examples of the method, UEs, and non-transitory computer-readable medium described herein may further include operations, features, means, or instructions for receiving a second control message indicating a configuration of a measurement gap pattern, where the one or more interruption durations may be based on the measurement gap pattern.

In some examples of the method, UEs, and non-transitory computer-readable medium described herein, the one or more interruption durations include one or more VILs associated with a network controlled small gap.

In some examples of the method, UEs, and non-transitory computer-readable medium described herein, the UCI message may be multiplexed with each of one or more uplink shared channel messages that may be transmitted during one or more valid uplink TOs.

In some examples of the method, UEs, and non-transitory computer-readable medium described herein, the one or more interruption durations may be associated with inter-band measurements or intra-band measurement in a time division duplexing band.

Some examples of the method, UEs, and non-transitory computer-readable medium described herein may further include operations, features, means, or instructions for determining to exclude the one or more invalid uplink TOs based on a collision of the one or more uplink TOs with the one or more interruption durations, and where the measurement duration corresponds to a synchronization signal measurement timing configuration window.

In some examples of the method, UEs, and non-transitory computer-readable medium described herein, the one or more uplink TOs partially overlap or completely overlap with the one or more interruption durations in a time domain.

In some examples of the method, UEs, and non-transitory computer-readable medium described herein, the UCI message includes a bitmap indicating exclusion of the one or more invalid uplink TOs.

In some examples of the method, UEs, and non-transitory computer-readable medium described herein, the UCI message includes a bitmap including one or more first bits indicating a first subset of the set of multiple uplink TOs including the quantity of unused uplink TOs and one or more second bits indicating a second subset of the set of multiple uplink TOs including a quantity of used uplink TOs.

BRIEF DESCRIPTION OF THE DRAWINGS

FIGS. 4 and 5 show block diagrams of devices that support visible interruption length considerations for configured grant transmission occasions in accordance with one or more aspects of the present disclosure.

FIG. 6 shows a block diagram of a communications manager that supports visible interruption length considerations for configured grant transmission occasions in accordance with one or more aspects of the present disclosure.

FIGS. 8 through 11 show flowcharts illustrating methods that support visible interruption length considerations for configured grant transmission occasions in accordance with one or more aspects of the present disclosure.

DETAILED DESCRIPTION

A network entity may indicate multiple physical uplink shared channel (PUSCH) occasions during a configured grant (CG) period in which a UE may transmit uplink signaling (e.g., one or more uplink CG PUSCH transmission occasions (TOs)). However, the UE may not have enough pending data to use all of the PUSCH TOs, in which case the UE may transmit an uplink control information (UCI) message including a bitmap indicating which PUSCH TOs are unused (e.g., skipped) by the UE. This may be referred to as an unused TO indicated by uplink control information (UTO-UCI) and may enable enhanced resource usage in the network, for example, when the network reallocates unused resources for other communications. Additionally, the UE and the network entity may consider some PUSCH occasions as invalid (e.g., due to collisions with other signaling). Because both the UE and the network entity can determine which PUSCH occasions are invalid, the UE may not include the invalid resources in the bitmap, reducing the size of the bitmap and reducing signaling overhead. This may result in improved throughput, decreased signaling overhead, among other advantages. However, additional scenarios may also render the PUSCH occasions invalid. For example, a network entity may configure measurements that include interruption periods associated with measurement gaps (e.g., visible interruption length (VIL) durations that correspond to a measurement length for network-controlled small gap (NCSG) configurations), such that the UE may not transmit (e.g., uplink messages in the scheduled PUSCH TOs) during these interruption periods.

As described herein, a UE may support techniques for defining PUSCH TOs that collide with VILs (e.g., interruption periods) as invalid. By defining such colliding TOs as invalid, the UE may remove bits that would otherwise indicate such PUSCH TOs in UCI (e.g., UTO-UCI), reducing a size of the UCI message, as well as reducing signaling overhead. That is, the UE may exclude one or more PUSCH TOs that collide with (e.g., at least partially overlap with) respective VILs from a UTO-UCI transmission. Further, a UE may exclude such invalid occasions when determining a hybrid automatic repeat request (HARQ) identifier (ID) of one or more feedback processes to increase an efficiency in HARQ ID management.

Aspects of the disclosure are initially described in the context of wireless communications systems. Aspects of the disclosure are further illustrated by and described with reference to process flows, apparatus diagrams, system diagrams, and flowcharts that relate to VIL considerations for CG TOs.

Figure 1:
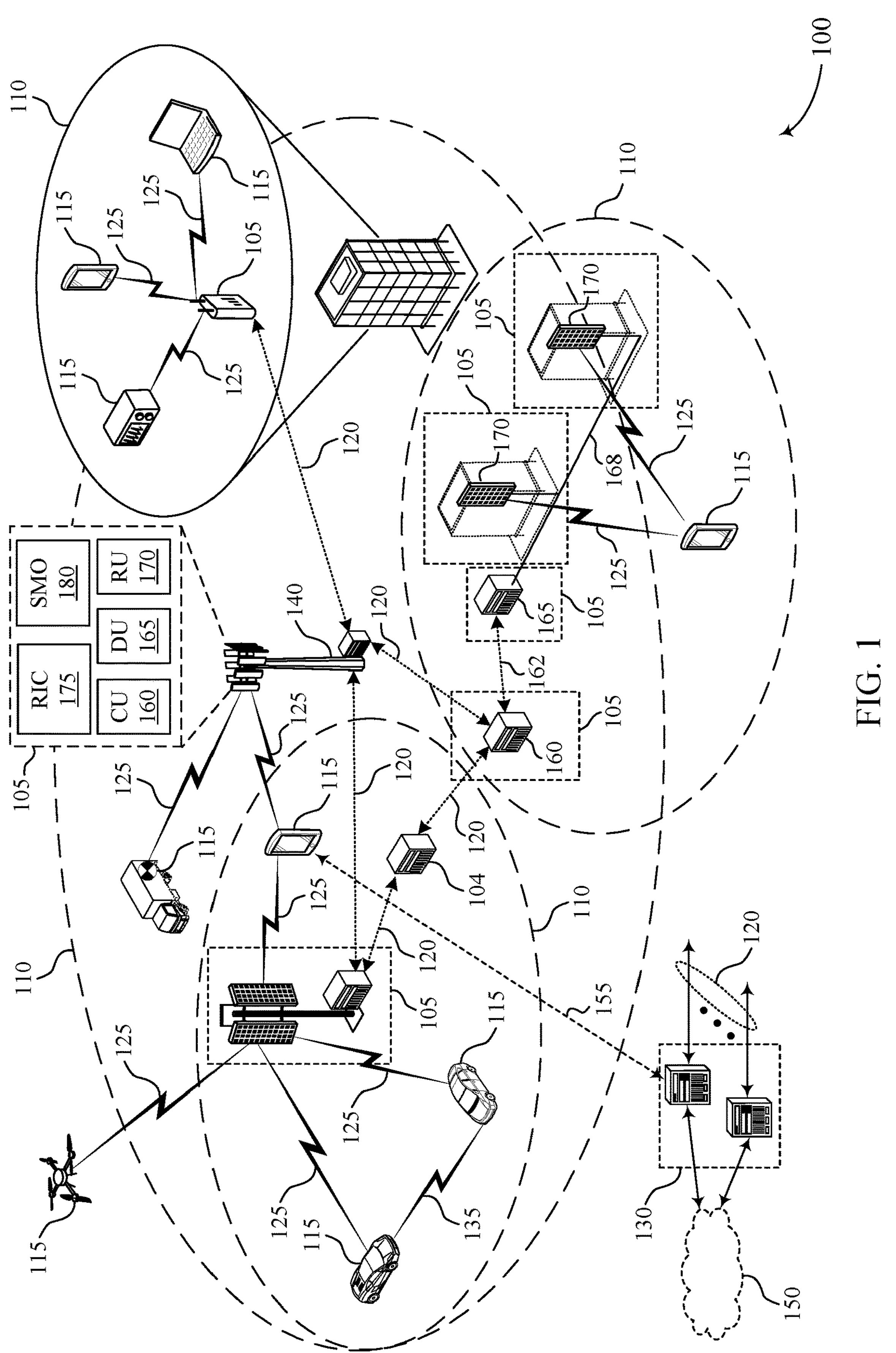
FIG. 1 shows an example of a wireless communications system that supports visible interruption length considerations for configured grant transmission occasions in accordance with one or more aspects of the present disclosure.

FIG. 1 shows an example of a wireless communications system 100 that supports VIL considerations for CG TOs in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the network entity 105 may indicate multiple PUSCH TOs during a CG period in which the UE 115 may transmit uplink signaling (e.g., one or more uplink CG PUSCH TOs. However, the UE 115 may not have enough pending data to use all of the PUSCH TOs, in which case the UE 115 may transmit a UCI message including a bitmap indicating which PUSCH TOs are unused (e.g., skipped) by the UE 115. This may be referred to as a PUSCH UTO-UCI and may enable enhanced resource usage in the network, for example, when the network reallocates unused resources for other communications.

Additionally, the UE 115 and the network entity 105 may consider some PUSCH TOs as invalid (e.g., due to collisions with other signaling). Because both the UE 115 and the network entity 105 may determine which PUSCH TOs are invalid, the UE 115 may not include the invalid resources in the bitmap, reducing the size of the bitmap and reducing signaling overhead. This may result in improved throughput, decreased signaling overhead, etc. However, additional scenarios may also render the PUSCH TOs invalid. For example, the UE 115 may perform measurements (e.g., configured by the network) that include interruption periods associated with measurement gaps (e.g., VIL durations that correspond to a measurement length for network-controlled small gap NCSG configurations), such that the UE 115 may not communicate (e.g., uplink messages in the scheduled PUSCH TOs) during these interruption periods.

In the wireless communications system 100, a UE 115 may define PUSCH TOs that collide with VILs (e.g., interruption periods) as invalid. By defining the colliding TOs as invalid, the UE 115 may remove bits from UCI that would otherwise indicate these PUSCH TOs (e.g., UTO-UCI), reducing a size of the UCI message, as well as reducing signaling overhead. Further, a UE 115 may exclude such invalid TOs when determining a HARQ ID of one or more feedback processes to increase an efficiency in HARQ ID management.

Figure 2:
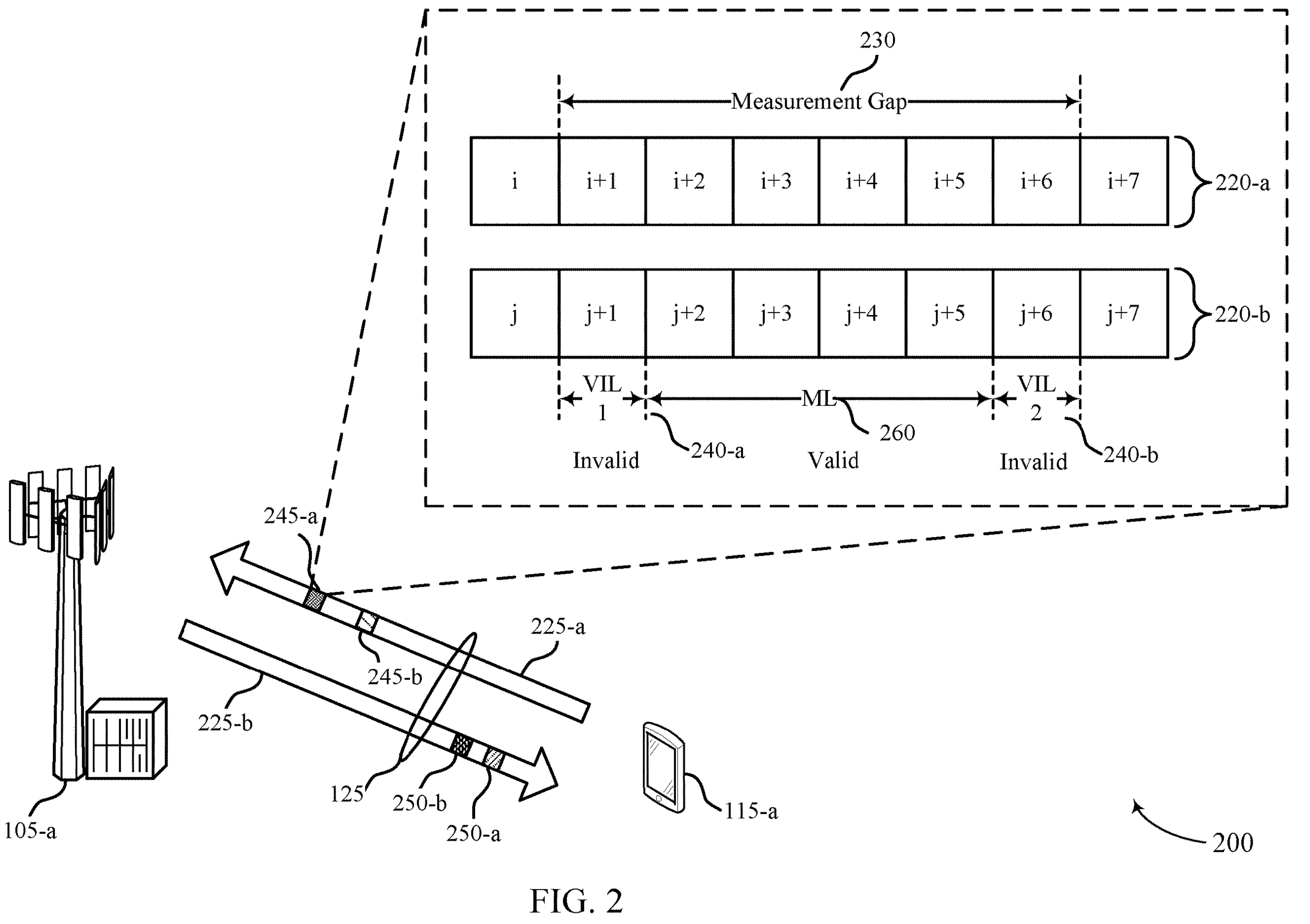
FIG. 2 shows an example of a wireless communications system that supports visible interruption length considerations for configured grant transmission occasions in accordance with one or more aspects of the present disclosure.

FIG. 2 shows an example of a wireless communications system 200 that supports VIL considerations for CG TOs in accordance with one or more aspects of the present disclosure. The wireless communications system 200 may implement aspects of or may be implemented by aspects of the wireless communications system 100. For example, the wireless communications system 200 includes a UE 115-*a* and a network entity 105-*a*, which may be examples of a UE 115 and a network entity 105 described with respect to FIG. 1.

In some examples, the UE 115-*a* and the network entity 105-*a* may consider some PUSCH TOs as invalid (e.g., due to collisions with other signaling), and the UE 115-*a* may not include the invalid resources in the UCI to the network entity 105-*a* to reduce the size of the UCI and reduce signaling overhead. This may result in improved throughput, decreased signaling overhead, or the like. However, additional scenarios may also render the PUSCH TOs invalid, and it may be desirable to define techniques such that these additional invalid PUSCH TOs may not be included in the UCI.

In some cases, applications, such as game rendering applications communicating with an extended reality (XR) headset, may have strict system conditions associated with data rate, latency, and power consumption. For example, the system conditions may include low latency and high reliability, such that 99% packets of XR traffic are to be delivered within packet delay budget (PDB) requirement (e.g., 10 ms). The system conditions may include low power consumption, such that a discontinuous reception (DRX) operation is implemented to save power consumption of multimedia devices executing the application. An enhanced connected mode discontinuous reception (eCDRX) may be implemented to align a DRX cycle with the multimedia devices. In some cases, a radio resource management (RRM) measurement gap may be a condition for mobile devices (e.g., UEs 115, multimedia devices) to operate in multifrequency cellular networks, resulting in increased packet delay of real-time multimedia traffic. Accordingly, an enhanced solution for an RRM measurement gap may be implemented to improve the user experience for XR applications.

In some cases, various CG enhancements may be implemented, where the enhancement includes multiple PUSCH TOs in each CG period for licensed spectrum or a UCI that indicates unused CG PUSCH TOS (UTO-UCI). These enhancements for preconfigured CG resources may be used to reduce uplink transmission latency otherwise caused by a scheduling request (SR) and/or a buffer status report (BSR) that are associated with a resource request. The resource request may be for uplink high data rate and low latency periodic traffic. The network (e.g., via the network entity 105-*a*) may configure (e.g., preconfigure) multiple CG PUSCH TOs in each cycle of uplink traffic. The UE 115-*a* may immediately starting transmitting PUSCHs on the CG PUSCH TOs when data arrives in the uplink data buffer. The UE 115-*a* may indicate the unused CG PUSCH TOs that are not used for uplink data transmission in UTO-UCI so that the network entity 105-*a* may reallocate these resources to other UEs 115.

In some examples, the multiple CG PUSCH TOs may be allocated in each CG period, where the beginning of the CG period is aligned with the data (e.g., augmented reality (AR) uplink video) in a generation cycle. The network entity 105-*a* may configure the UE 115-*a* to send the UTO-UCI for the CG configuration, where the UTO-UCI is sent in each transmitted PUSCH of the CG.

In some examples, invalid CG PUSCH TO may be defined for the multi-PUSCH CG and UTO-UCI. For unpaired spectrum (e.g., TDD), a CG PUSCH TO may be considered as invalid if it collides with one or more downlink symbol(s) indicated by a configuration (e.g., TDD-UL-DL-ConfigurationCommon or TDD-UL-DL-Configuration-Dedicated), or if the CG PUSCH TO collides with one or more symbol(s) of a synchronization signal block (SSB) or a physical broadcast channel (PBCH) block (e.g., with index provided by an SBB burst, such as an SSB-PositionsInBurst signal). The collision condition may also include SSBs for intercell multiple transmission-reception points (TRPs). In some cases, dynamic collision and dynamic cancellation of a CG PUSCH TO may not be considered as an invalid CG PUSCH TO.

In some cases, invalid CG PUSCH TOs may be used in HARQ ID determination for CG PUSCH TOs and UTO-UCI indication for unused CG PUSCH TOs. For example, HARQ ID may be determined for the first configured CG PUSCH TO (valid or invalid) within the multi-PUSCH CG period and subsequent valid CG PUSCH occasions within a CG period. The UTO-UCI may not indicate an unused or used (e.g., reserved) status for invalid CG PUSCH TOs. Invalid CG PUSCH TOs may be excluded from HARQ ID determinations and UTO-UCI for more efficient HARQ ID management and reduced UTO-UCI payload size.

In some examples, the UE 115-*a* may perform measurements on neighboring cells (e.g., target cells) and other carrier components using different frequencies. However, the UE 115-*a* may not perform the inter-frequency measurements while maintaining data traffic with serving cell, for example, due to using a single RF module to reduce manufacturing costs of the UE 115-*a* and/or form factor size considerations. Accordingly, the UE 115-*a* may not receive a physical downlink shared channel (PDSCH), a physical downlink control channel (PDCCH), and/or a channel state interference reference signal (CSI-RS) from the serving cell during a measurement gap period (e.g., measurement gap occasion). Moreover, the UE 115-*a* may not transmit a physical uplink control channel (PUCCH), a PUSCH, or a sounding reference signal (SRS) to the serving cell (e.g., the network entity 105-*a*) during the measurement gap period. Scheduling restrictions associated with communicating with the serving cell during the measurement gap period may be reduced as discussed herein.

In some examples, the wireless communications system 200 may involve NCSG configurations of a NCSG pattern that includes two interruptions (e.g., VILs) and a measurement portion (e.g., measurement length). For example, the NCSG pattern may include a first VIL (VIL 1), followed by a measurement length, followed by a second VIL (VIL2). In some cases, the NCSG pattern may include a visible interruption repetition period (VIRP) including one or more VILs. A relatively short VIL duration may be associated with the UE 115-*a* activating hardware or RF resources of the UE 115-*a* for measuring and/or communicating (e.g., receiving signals) during the measurement length. The relatively short VIL may also impact throughput gain that is recovered. A scheduling restriction may not occur during the measurement length, but a scheduling restriction may occur during each of the VILs (e.g., VIL 1 and VIL 2).

In an NCSG pattern, an interruption (e.g., VIL 1) may occur over a quantity of slots (e.g., two slots) before measurements (e.g., having a duration of 1 ms) and over a quantity of slots (e.g., two slots) after measurements (e.g., VIL 2 having a duration of 1 ms), and the duration between the two interruptions may be used for measurements (e.g., measurement length having a duration of 4 ms). In some examples, the network entity 105-*a* may configure the UE 115-*a* with a 6 ms measurement gap, and for the NCSG pattern, the 6 ms may be divided into 1 ms interruption, 4 ms measurement length (e.g., data may be scheduled here at least for a first frequency (FR1)), and another 1 ms interruption. Other configurations for the measurement and VILs (e.g., interruptions) may be possible.

The CG enhancements discussed herein may be categorized as dedicated RRC configuration for uplink. However, the UE 115-*a* may not be configured with CG for PUSCH transmission. For example, when a collision with a dynamically scheduled downlink transmission occurs, a CG PUSCH may not be transmitted by the UE 115-*a*. Also, the CG PUSCH may not be transmitted due to a collision with an SSB. In some examples, invalid CG PUSCH may include semi-static condition for TDD in an unpaired spectrum. For intra-band or inter-band measurements (e.g., and where the UE 115-*a* has spare RF), the NCSG pattern with the interruption may include two VIL slots before measurements (e.g., 1 ms) and two VIL slots after measurements (e.g., 1 ms) and the duration between the two interruptions (e.g., 4 ms) may be used for measurements. During a VIL, the UE 115-*a* may not transmit PUSCH, PUCCH, and/or SRS since the UE 115-*a* may be RF tuning to another frequency (FR2) to measure the target cell. If the UE 115-*a* is configured with CG PUSCH occasions and the UTO-UCI unused indication (e.g., unused indication), indicating CG PUSCH occasions that fall within the VIL may be an inefficient transmission of bits in the indication since the UE 115-*a* may not use these resources. In some examples, a UTO-UCI bitmap size may be RRC configured with a bitmap size between 3 and 8 bits.

As described herein, UE 115-*a* may define PUSCH TOs that collide with VILs (e.g., interruption periods) as invalid to remove bits that would otherwise indicate such PUSCH TOs in the UCI. For example, the network entity 105-*a* may communicate with the UE 115-*a* using a communication link 125. In some examples, the communication link 125 may include a first channel 225-*a* for transmitting data from the UE 115-*a* to the network entity 105-*a* and a second channel 225-*b* for transmitting data from the network entity 105-*a* to the UE 115-*a*. The communication link 125 may be an example of an NR or LTE link between the UE 115-*a* and the network entity 105-*a*. The communication link 125 may include a bi-directional link that enables both uplink and downlink communications, for example, via the channels 225.

The UE 115-*a* may transmit uplink messages 245 (e.g., uplink transmissions), such as uplink control signals or uplink data signals, to the network entity 105-*a* using the first channel 225-*a* (e.g., of the communication link 125) and the network entity 105-*a* may transmit downlink messages 250 (e.g., downlink transmissions), such as downlink control signals or downlink data signals, to the UE 115-*a* using the second channel 225-*b* (e.g., of the communication link 125). In some examples, the downlink messages 250 may be part of control signaling transmitted from the network entity 105-*a*. In some examples, the multiple messages outputted via multiple downlink messages 250, respectively, may be outputted in a single downlink message 250, and the multiple messages transmitted via multiple uplink messages 245, respectively, may be outputted in a single uplink message 245.

In an example, the network entity 105-*a* may output a first downlink message 250-*a*, which includes a control message indicating a CG configuration (e.g., an uplink CG configuration, a semi-persistent scheduling (SPS) configuration), where the CG configuration includes multiple uplink TOs within a time period. The UE 115-*a* may transmit, using at least one of multiple uplink TOs in accordance with the CG configuration, a first uplink message 245-*a* including a control information message. The control information message may include an indication of a quantity of unused uplink TOs of the multiple uplink TOs. The indication may exclude one or more invalid uplink TOs that correspond to one or more uplink TOs of the multiple TOs that at least partially overlap with one or more interruption durations (e.g., VIL duration) associated with a measurement duration (e.g., measurement gap duration).

To illustrate, a measurement gap 230 in a measurement period may include a pattern of VILs 240 and measurement lengths 260. In some examples, the measurement gap 230 may include time and frequency resources, such as eight first frequency slots 220-*a* (e.g., slot i+1 through slot i+6) at a first frequency (e.g., a first serving carrier) and eight second frequency slots 220-*b* (e.g., slot j+1 through slot j+6) at a second frequency (e.g., a second serving carrier).

The measurement gap 230 may include a first VIL 240-*a* (VIL 1) in a single slot 220 for both frequencies (e.g., slot i+1 and slot j+1). The measurement gap 230 may include a measurement length 260 of four slots 220 after the first VIL 240 at both frequencies (e.g., i+2, i+2, i+4, i+5 in the first serving carrier and j+2, j+3, j+4, j+5 in the second serving carrier). The measurement gap 230 may include a second VIL 240-*b* in a single slot for both frequencies (e.g., slot i+6 and slot j+6) after the measurement length 260. The slots 220 in which the VILs 240 occur, a CG PUSCH TOs may be invalid due to collision with a VIL. The slots in which the VILs 240 do not occur, such as during the measurement length 260, the CG PUSCH TO may be valid within the measurement gap 230. Accordingly, the UE 115-*a* may determine a HARQ ID based on incrementing for valid CG PUSCH TOs (e.g., i+2, i+2, i+4, i+5 in the first serving carrier and j+2, j+3, j+4, j+5 in the second serving carrier) after the first configured CG PUSCH TO in a CG period. Similarly, UTO-UCI may not include an indication for invalid CG PUSCH TOs. A CG PUSCH TO colliding the VIL for RF tuning and/or RF switching is also invalid and may not be included in an indication from the UE 115-*a*.

In some examples, the UE 115-*a* may transmit a second uplink message 245-*b*, which includes one or more acknowledgment (ACK) or negative acknowledgment (NACK) messages in accordance with an ID. The ID may be based at least on a first CG PUSCH occasion corresponding to a first uplink TO of the multiple TOs, where the ID is further based on the quantity of unused uplink TOs excluded from the indication. The network entity 105-*a* may output a second downlink message 250-*b*, which includes a control message indicating a configuration of a measurement gap pattern (e.g., of the measurement gap 230), where the one or more interruption durations are based on the measurement gap pattern.

In some examples, when the UE 115-*a* performs inter-frequency or intra-frequency measurements with NCSG in a TDD band, the UE 115-*a* may consider the CG PUSCH that partially or fully overlaps with the VIL as invalid, as discussed with respect to the measurement gap 230. These CG PUSCH TOs may be excluded from the bitmap of a UTO-UCI that indicates unused (e.g., skipping over) CG PUSCH TOs. Similarly, when the UE performs inter-frequency or intra-frequency measurements with NCSG in a TDD band, the UE 115-*a* may not increment the HARQ ID for multiple CG PUSCHs when a CG PUSCH partially or fully overlaps with a VIL, unless the overlap is for a first CG PUSCH occasion when incrementing HARQ IDs (e.g., slots i and j). Not incrementing the HARQ ID for multiple CG PUSCHs when a CG PUSCH partially or fully overlaps with a VIL may facilitate efficient HARQ ID management and reduce UTO-UCI size.

In some examples, the UTO-UCI indication may be applicable to valid CG PUSCH TOs. For the UE 115-*a* configured with NCSG, in the UTO-UCI, OUTO-UCI CG PUSCH TOs may exclude invalid ones where a UE 115-*a* does not transmit a PUSCH TO due to collision of the PUSCH with the VIL of NCSG before and after a signal measurement timing configuration (SMTC) window (e.g., the measurement length 260). For example, a bit value of '0' may indicate that the UE 115-*a* may transmit CG PUSCH, and a bit value of '1' may indicate that the UE 115-*a* may not transmit CG PUSCH, in a corresponding CG-PUSCH TO. When the UE 115-*a* indicates by UTO-UCI a value of '1' for a CG-PUSCH TO, the UE 115-*a* may continue to indicate the value of '1' for the CG PUSCH TO by UTO-UCI multiplexed in subsequent CG-PUSCH transmissions, and the UE 115-*a* may not transmit CG PUSCH in the CG PUSCH TO. Additionally, in some examples, the HARQ ID for CG PUSCH TOs after the first configured HARQ ID in the CG period is determined for valid CG PUSCH TOs. For example, the HARQ ID for a K valid configured PUSCH grant, where 1<K≤quantity of slots in CG period, excludes invalid configured PUSCH grant(s) that are not transmitted due to collision with downlink symbol(s) indicated by TDD uplink or downlink configuration (e.g., TDD-UL-DL-ConfigurationCommon or TDD-UL-DL-ConfigurationDedicated), or symbol(s) of an SSB or PBCH block with index provided by SBB burst, or due to overlap with a VIL of an NCSG if the UE 115-*a* is configured with NCSG.

Figure 3:
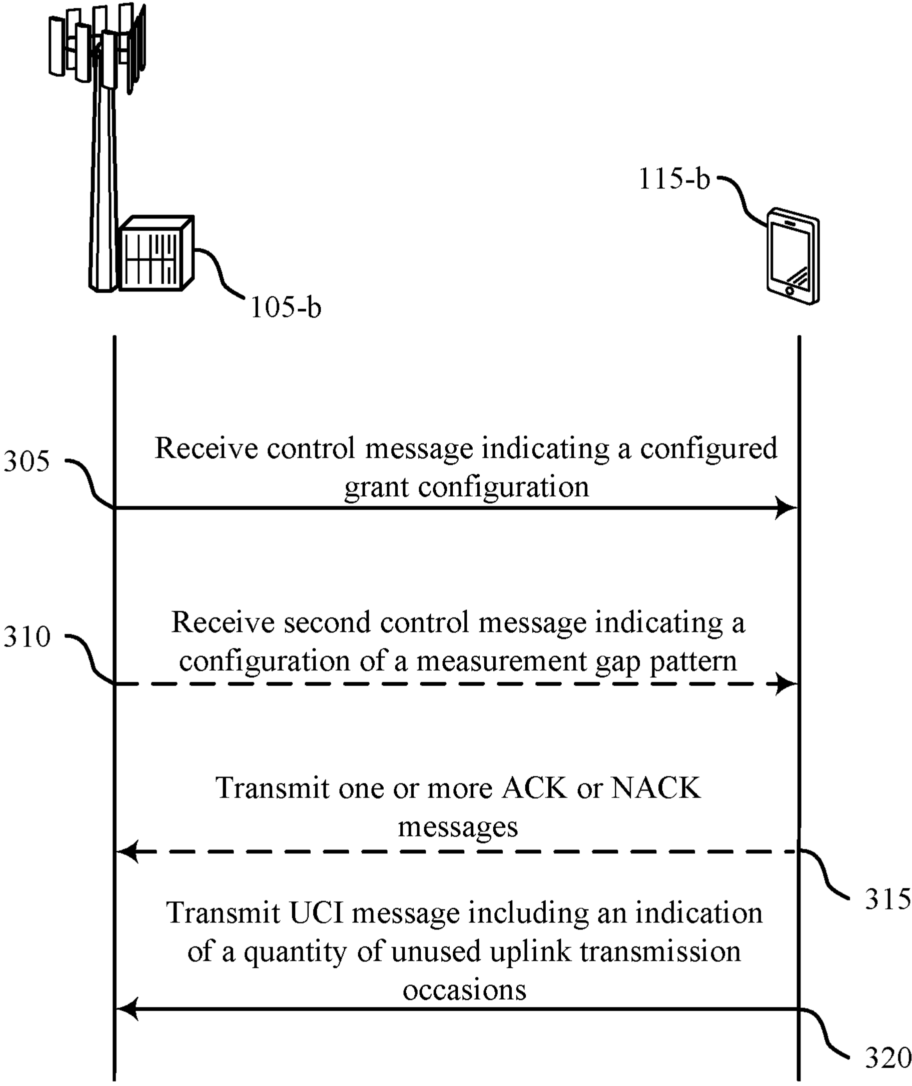
FIG. 3 shows an example of a process flow that supports visible interruption length considerations for configured grant transmission occasions in accordance with one or more aspects of the present disclosure.

FIG. 3 shows an example of a process flow 300 that supports VIL considerations for CG TOs in accordance with one or more aspects of the present disclosure. The process flow 300 may implement aspects of or may be implemented by aspects of the wireless communications systems 100 and 200. For example, the process flow 300 may include a UE 115-*b*, which may be an example of a UE 115 as described herein. The process flow 300 may include a network entity 105-*b*, which may be an example of a network entity 105 as described herein. In the following description of the process flow 300, the operations performed by the UE 115-*b* and the network entity 105-*b* may be performed in different orders or at different times than the exemplary order shown. Some operations may also be omitted from the process flow 300, or other operations may be added to the process flow 300. Further, while operations in the process flow 300 are illustrated as being performed by the UE 115-*b* and the network entity 105-*b*, the examples herein are not to be construed as limiting, as the described features may be associated with any quantity of different devices.

At 305, the UE 115-*b* may receive a control message indicating a CG configuration, the CG configuration including multiple uplink TOs (e.g., CG PUSCH TOs) within a time period. In some examples, at 310, the UE 115-*b* may receive a second control message indicating a configuration of a measurement gap pattern. One or more interruption durations may be based on a measurement gap pattern. In some examples, at 315, the UE 115-*b* may transmit one or more ACK or NACK messages in accordance with an ID. The ID may be based at on a first uplink shared channel occasion (e.g., PUSCH TO) corresponding to a first uplink TO of the multiple uplink TOs. The ID may further be based on the quantity of unused uplink TOs excluded from the indication. The one or more interruption durations may include one or more VILs associated with a NCSG. The one or more interruption durations may be associated with inter-band measurements or intra-band measurement in a TDD band.

At 320, the UE 115-*b* may transmit, using at least one of the multiple uplink TOs in accordance with the CG configuration, a UCI message including an indication of a quantity of unused uplink TOs of the multiple uplink TOs. The indication may exclude one or more invalid uplink TOs that correspond to one or more uplink TOs of the multiple uplink TOs that at least partially overlap with the one or more interruption durations associated with the measurement duration. The UCI may be multiplexed with each of one or more uplink shared channel messages that are transmitted during one or more valid uplink TOs. In some examples, the UE 115-*b* may determine to exclude the one or more invalid uplink TOs based on a collision of the one or more uplink TOs with the one or more interruption durations. The measurement duration may correspond to a SMTC window. In some examples, the one or more uplink TOs partially overlap or completely overlap with the one or more interruption durations in a time domain. The UCI message may include a bitmap indicating exclusion of the one or more invalid uplink TOs. The UCI message may include a bitmap including one or more first bits indicating a first subset of the multiple uplink TOs including the quantity of unused uplink TOs and one or more second bits indicating a second subset of the multiple uplink TOs including a quantity of used uplink TOs.

Figure 4:
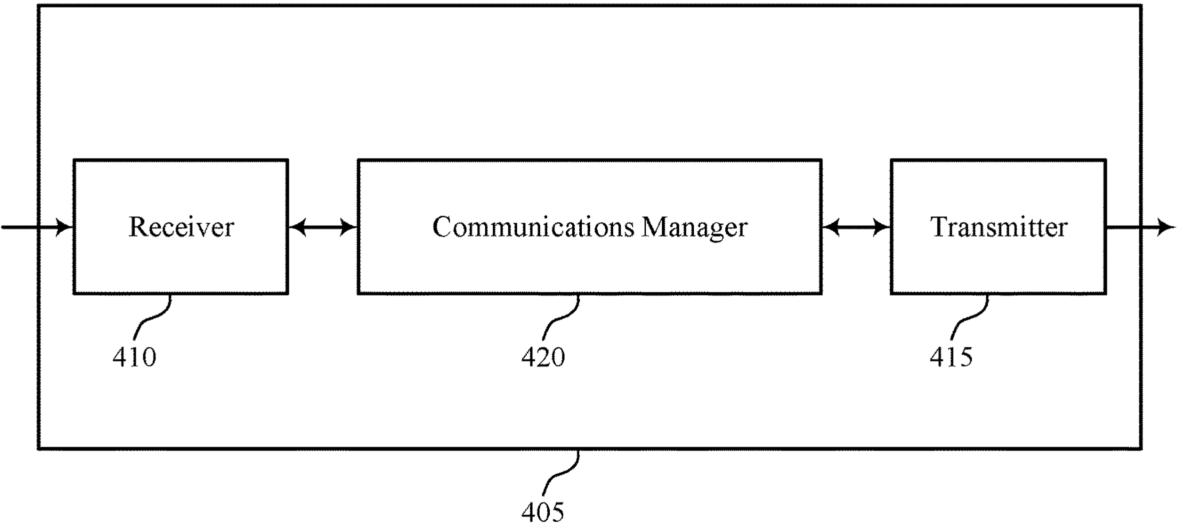

FIG. 4 shows a block diagram 400 of a device 405 that supports VIL considerations for CG TOs in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to VIL considerations for CG TOs). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to VIL considerations for CG TOs). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of VIL considerations for CG TOs as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication in accordance with examples as disclosed herein. For example, the communications manager 420 is capable of, configured to, or operable to support a means for receiving a control message indicating a CG configuration, the CG configuration including a set of multiple uplink TOs within a time period. The communications manager 420 is capable of, configured to, or operable to support a means for transmitting, using at least one of the set of multiple uplink TOs in accordance with the CG configuration, an uplink control information message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reducing a size of the UCI message, as well as for reducing signaling overhead, thereby improving resource utilization and system efficiency.

FIG. 5 shows a block diagram 500 of a device 505 that supports VIL considerations for CG TOs in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to VIL considerations for CG TOs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to VIL considerations for CG TOs). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of VIL considerations for CG TOs as described herein. For example, the communications manager 520 may include a control message reception manager 525 a control message transmission manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. The control message reception manager 525 is capable of, configured to, or operable to support a means for receiving a control message indicating a CG configuration, the CG configuration including a set of multiple uplink TOs within a time period. The control message transmission manager 530 is capable of, configured to, or operable to support a means for transmitting, using at least one of the set of multiple uplink TOs in accordance with the CG configuration, an uplink control information message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

FIG. 6 shows a block diagram 600 of a communications manager 620 that supports VIL considerations for CG TOs in accordance with one or more aspects of the present disclosure. The communications manager 620 may be an example of aspects of a communications manager 420, a communications manager 520, or both, as described herein. The communications manager 620, or various components thereof, may be an example of means for performing various aspects of VIL considerations for CG TOs as described herein. For example, the communications manager 620 may include a control message reception manager 625, a control message transmission manager 630, a feedback message manager 635, an invalid uplink transmission manager 640, or any combination thereof. Each of these components, or components or subcomponents thereof (e.g., one or more processors, one or more memories), may communicate, directly or indirectly, with one another (e.g., via one or more buses).

The communications manager 620 may support wireless communication in accordance with examples as disclosed herein. The control message reception manager 625 is capable of, configured to, or operable to support a means for receiving a control message indicating a CG configuration, the CG configuration including a set of multiple uplink TOs within a time period. The control message transmission manager 630 is capable of, configured to, or operable to support a means for transmitting, using at least one of the set of multiple uplink TOs in accordance with the CG configuration, an uplink control information message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

In some examples, the feedback message manager 635 is capable of, configured to, or operable to support a means for transmitting one or more ACK or NACK messages in accordance with an ID, the ID is based on a first uplink shared channel occasion corresponding to a first uplink TO of the set of multiple uplink TOs, where the ID is further based on the quantity of unused uplink TOs excluded from the indication.

In some examples, the control message reception manager 625 is capable of, configured to, or operable to support a means for receiving a second control message indicating a configuration of a measurement gap pattern, where the one or more interruption durations are based on the measurement gap pattern.

In some examples, the one or more interruption durations include one or more VILs associated with an NCSG. In some examples, the uplink control information message is multiplexed with each of one or more uplink shared channel messages (e.g., PUSCH transmissions) that are transmitted during one or more valid uplink TOs. In some examples, the one or more interruption durations are associated with inter-band measurements and/or intra-band measurement in a TDD band.

In some examples, the invalid uplink transmission manager 640 is capable of, configured to, or operable to support a means for determining to exclude the one or more invalid uplink TOs based on a collision of the one or more uplink TOs with the one or more interruption durations, and where the measurement duration corresponds to a synchronization SMTC window.

In some examples, the one or more uplink TOs partially overlap or completely overlap with the one or more interruption durations in a time domain. In some examples, the uplink control information message includes a bitmap indicating exclusion of the one or more invalid uplink TOs.

In some examples, the uplink control information message includes a bitmap including one or more first bits indicating a first subset of the set of multiple uplink TOs including the quantity of unused uplink TOs and one or more second bits indicating a second subset of the set of multiple uplink TOs including a quantity of used uplink TOs.

Figure 7:
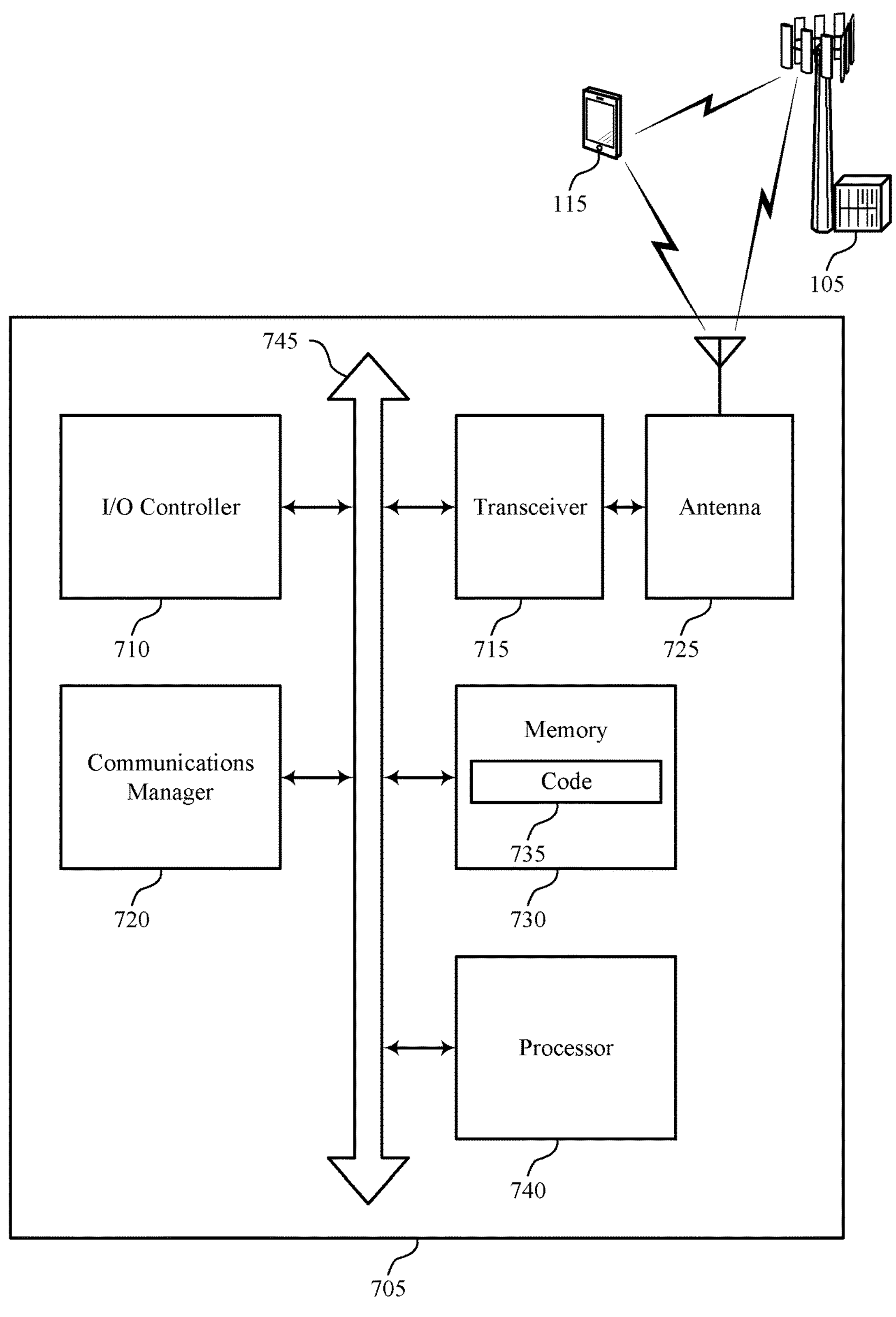
FIG. 7 shows a diagram of a system including a device that supports visible interruption length considerations for configured grant transmission occasions in accordance with one or more aspects of the present disclosure.

FIG. 7 shows a diagram of a system 700 including a device 705 that supports VIL considerations for CG TOs in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting VIL considerations for CG TOs). For example, the device 705 or a component of the device 705 may include at least one processor 740 and at least one memory 730 coupled with or to the at least one processor 740, the at least one processor 740 and the at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communication in accordance with examples as disclosed herein. For example, the communications manager 720 is capable of, configured to, or operable to support a means for receiving a control message indicating a CG configuration, the CG configuration including a set of multiple uplink TOs within a time period. The communications manager 720 is capable of, configured to, or operable to support a means for transmitting, using at least one of the set of multiple uplink TOs in accordance with the CG configuration, an uplink control information message including an indication of a quantity of unused uplink TOs of the set of multiple uplink TOs, where the indication excludes one or more invalid uplink TOs that correspond to one or more uplink TOs of the plurality that at least partially overlap with one or more interruption durations associated with a measurement duration.

By including or configuring the communications manager 720 in accordance with examples as described herein, the device 705 may support techniques for reducing a size of UCI signaling, as well as for reducing signaling overhead. In particular, the examples described herein may be associated with rules for identifying invalid uplink TOs, which may enable a UE to refrain from including such invalid uplink TOs from a UTO-UCI that is transmitted to the network. As such, a size of the UTO-UCI may be relatively reduced (e.g., by excluding bits that would have otherwise been included) and therefore enable enhanced resource usage.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of VIL considerations for CG TOs as described herein, or the at least one processor 740 and the at least one memory 730 may be otherwise configured to, individually or collectively, perform or support such operations.

FIG. 8 shows a flowchart illustrating a method 800 that supports VIL considerations for CG TOs in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include receiving a control message indicating a CG configuration, the CG configuration including a plurality of uplink TOs within a time period. The operations of 805 may be performed in accordance with examples as disclosed herein. In some examples, aspects of the operations of 805 may be performed by a control message reception manager 625 as described with reference to FIG. 6.

At 810, the method may include transmitting, using at least one of the plurality of uplink TOs in accordance with the CG configuration, an uplink control information message including an indication of a quantity of unused uplink TOs of the plurality of uplink TOs, where the indication excludes one or more invalid uplink TOs that correspond to one or more uplink TOs of the plurality that at least partially overlap with one or more interruption durations associated with a measurement duration. The operations of 810 may be performed in accordance with examples as disclosed herein. In some examples, aspects of the operations of 810 may be performed by a control message transmission manager 630 as described with reference to FIG. 6.

FIG. 9 shows a flowchart illustrating a method 900 that supports VIL considerations for CG TOs in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include receiving a control message indicating a CG configuration, the CG configuration including a plurality of uplink TOs within a time period. The operations of 905 may be performed in accordance with examples as disclosed herein. In some examples, aspects of the operations of 905 may be performed by a control message reception manager 625 as described with reference to FIG. 6.

At 910, the method may include transmitting one or more ACK or NACK messages in accordance with an ID, the ID is based at least in part on a first uplink shared channel occasion corresponding to a first uplink TO of the plurality of uplink TOs, wherein the ID is further based at least in part on the quantity of unused uplink TOs excluded from the indication. The operations of 910 may be performed in accordance with examples as disclosed herein. In some examples, aspects of the operations of 910 may be performed by a feedback message manager 635 as described with reference to FIG. 6.

At 915, the method may include transmitting, using at least one of the plurality of uplink TOs in accordance with the CG configuration, an uplink control information message comprising an indication of a quantity of unused uplink TOs of the plurality of uplink TOs, wherein the indication excludes one or more invalid uplink TOs that correspond to one or more uplink TOs of the plurality that at least partially overlap with one or more interruption durations associated with a measurement duration. The operations of 915 may be performed in accordance with examples as disclosed herein. In some examples, aspects of the operations of 915 may be performed by a control message transmission manager 630 as described with reference to FIG. 6.

Figure 10:
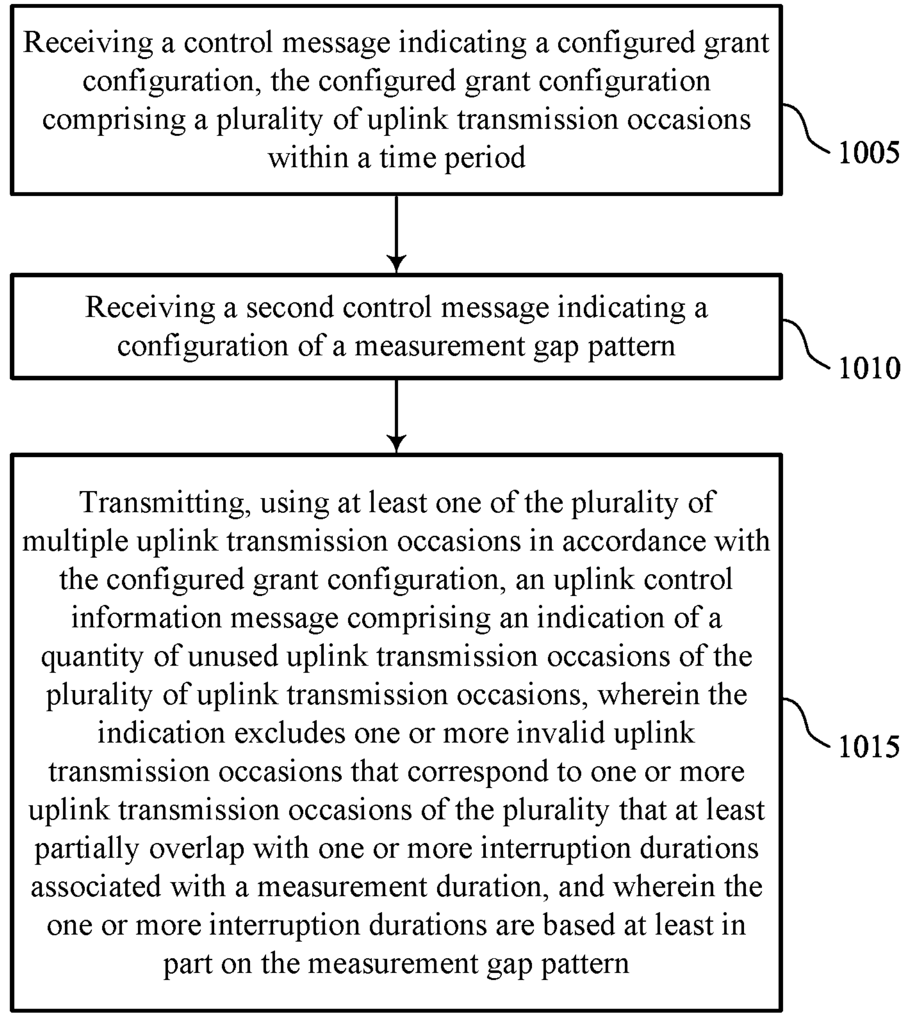

FIG. 10 shows a flowchart illustrating a method 1000 that supports VIL considerations for CG TOs in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include receiving a control message indicating a CG configuration, the CG configuration including a plurality of uplink TOs within a time period. The operations of 1005 may be performed in accordance with examples as disclosed herein. In some examples, aspects of the operations of 1005 may be performed by a control message reception manager 625 as described with reference to FIG. 6.

At 1010, the method may include receiving a second control message indicating a configuration of a measurement gap pattern. The operations of 1010 may be performed in accordance with examples as disclosed herein. In some examples, aspects of the operations of 1010 may be performed by a control message reception manager 625 as described with reference to FIG. 6.

At 1015, the method may include transmitting, using at least one of the plurality of multiple uplink TOs in accordance with the CG configuration, an uplink control information message comprising an indication of a quantity of unused uplink TOs of the plurality of uplink TOs, wherein the indication excludes one or more invalid uplink TOs that correspond to one or more uplink TOs of the plurality that at least partially overlap with one or more interruption durations associated with a measurement duration, and wherein the one or more interruption durations are based at least in part on the measurement gap pattern. The operations of 1015 may be performed in accordance with examples as disclosed herein. In some examples, aspects of the operations of 1015 may be performed by a control message transmission manager 630 as described with reference to FIG. 6.

Figure 11:
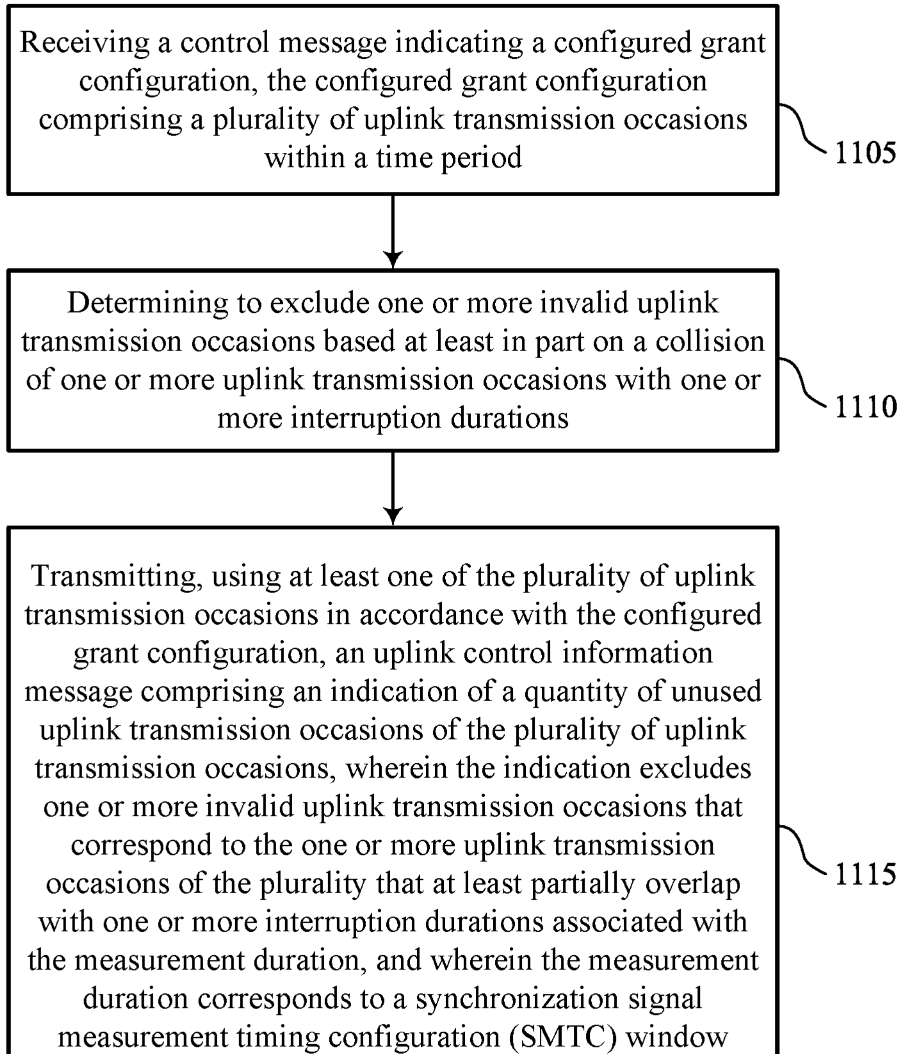

FIG. 11 shows a flowchart illustrating a method 1100 that supports VIL considerations for CG TOs in accordance with one or more aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1105, the method may include receiving a control message indicating a CG configuration, the CG configuration comprising a plurality of uplink TOs within a time period. The operations of 1105 may be performed in accordance with examples as disclosed herein. In some examples, aspects of the operations of 1105 may be performed by a control message reception manager 625 as described with reference to FIG. 6.

At 1110, the method may include determining to exclude one or more invalid uplink TOs based at least in part on a collision of the one or more uplink TOs with one or more interruption durations. The operations of 1110 may be performed in accordance with examples as disclosed herein. In some examples, aspects of the operations of 1110 may be performed by an invalid uplink transmission manager 640 as described with reference to FIG. 6.

At 1115, the method may include transmitting, using at least one of the plurality of uplink TOs in accordance with the CG configuration, an uplink control information message comprising an indication of a quantity of unused uplink TOs of the plurality of uplink TOs, where the indication excludes one or more invalid uplink TOs that correspond to the one or more uplink TOs of the plurality that at least partially overlap with the one or more interruption durations associated with a measurement duration, and wherein the measurement duration corresponds to a synchronization SMTC window. The operations of 1115 may be performed in accordance with examples as disclosed herein. In some examples, aspects of the operations of 1115 may be performed by a control message transmission manager 630 as described with reference to FIG. 6.

The following provides an overview of aspects of the present disclosure:

Aspect 1: A method for wireless communication by a UE, comprising: receiving a control message indicating a CG configuration, the CG configuration comprising a plurality of uplink TOs within a time period; and transmitting, using at least one of the plurality of uplink TOs in accordance with the CG configuration, an UCI message comprising an indication of a quantity of unused uplink TOs of the plurality of uplink TOs, wherein the indication excludes one or more invalid uplink TOs that correspond to one or more uplink TOs of the plurality that at least partially overlap with one or more interruption durations associated with a measurement duration.

Aspect 2: The method of aspect 1, further comprising: transmitting one or more acknowledgment or negative acknowledgment messages in accordance with an ID, the ID is based at least in part on a first uplink shared channel occasion corresponding to a first uplink TO of the plurality of uplink TOs, wherein the ID is further based at least in part on the quantity of unused uplink TOs excluded from the indication.

Aspect 3: The method of any of aspects 1 through 2, further comprising: receiving a second control message indicating a configuration of a measurement gap pattern, wherein the one or more interruption durations are based at least in part on the measurement gap pattern.

Aspect 4: The method of any of aspects 1 through 3, wherein the one or more interruption durations comprise one or more VILs associated with a NCSG.

Aspect 5: The method of any of aspects 1 through 4, wherein the UCI message is multiplexed with each of one or more uplink shared channel messages that are transmitted during one or more valid uplink TOs.

Aspect 6: The method of any of aspects 1 through 5, wherein the one or more interruption durations are associated with inter-band measurements or intra-band measurement in a time division duplexing band.

Aspect 7: The method of any of aspects 1 through 6, further comprising: determining to exclude the one or more invalid uplink TOs based at least in part on a collision of the one or more uplink TOs with the one or more interruption durations, and wherein the measurement duration corresponds to a SMTC window.

Aspect 8: The method of any of aspects 1 through 7, wherein the one or more uplink TOs partially overlap or completely overlap with the one or more interruption durations in a time domain.

Aspect 9: The method of any of aspects 1 through 8, wherein the UCI message comprises a bitmap indicating exclusion of the one or more invalid uplink TOs.

Aspect 10: The method of any of aspects 1 through 9, wherein the UCI message comprises a bitmap comprising one or more first bits indicating a first subset of the plurality of uplink TOs comprising the quantity of unused uplink TOs and one or more second bits indicating a second subset of the plurality of uplink TOs comprising a quantity of used uplink TOs.

Aspect 11: A UE for wireless communication, comprising one or more memories storing processor-executable code, and one or more processors coupled with the one or more memories and individually or collectively operable to execute the code to cause the UE to perform a method of any of aspects 1 through 10.

Aspect 12: A UE for wireless communication, comprising at least one means for performing a method of any of aspects 1 through 10.

Aspect 13: A non-transitory computer-readable medium storing code for wireless communication, the code comprising instructions executable by one or more processors to perform a method of any of aspects 1 through 10.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a first control message indicating a configured grant configuration, the configured grant configuration comprising a plurality of uplink transmission occasions within a time period;

receive a second control message indicating a configuration of a measurement gap pattern; and transmit, using at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that correspond to one or more uplink transmission occasions of the plurality that at least partially overlap with one or more interruption durations associated with a measurement duration, wherein the one or more interruption durations are based at least in part on the measurement gap pattern.

2. The UE of claim 1, wherein the one or more processors are individually or collectively further operable to execute the code to cause the UE to:

transmit one or more acknowledgment or negative acknowledgment messages in accordance with an identifier, the identifier is based at least in part on a first uplink shared channel occasion corresponding to a first uplink transmission occasion of the plurality of uplink transmission occasions, wherein the identifier is further based at least in part on the quantity of unused uplink transmission occasions excluded from the indication.

3. The UE of claim 1, wherein the one or more interruption durations comprise one or more visible interruption lengths associated with a network controlled small gap.

4. The UE of claim 1, wherein the uplink control information message is multiplexed with each of one or more uplink shared channel messages that are transmitted during one or more valid uplink transmission occasions.

5. The UE of claim 1, wherein the one or more interruption durations are associated with inter-band measurements or intra-band measurement in a time division duplexing band.

6. The UE of claim 1, wherein the one or more processors are individually or collectively further operable to execute the code to cause the UE to:

determine to exclude the one or more invalid uplink transmission occasions based at least in part on a collision of the one or more uplink transmission occasions with the one or more interruption durations, and wherein the measurement duration corresponds to a synchronization signal measurement timing configuration (SMTC) window.

7. The UE of claim 1, wherein the one or more uplink transmission occasions partially overlap or completely overlap with the one or more interruption durations in a time domain.

8. The UE of claim 1, wherein the uplink control information message comprises a bitmap indicating exclusion of the one or more invalid uplink transmission occasions.

9. The UE of claim 1, wherein the uplink control information message comprises a bitmap comprising one or more first bits indicating a first subset of the plurality of uplink transmission occasions comprising the quantity of unused uplink transmission occasions and one or more second bits indicating a second subset of the plurality of uplink transmission occasions comprising a quantity of used uplink transmission occasions.

10. A method for wireless communication by a user equipment (UE), comprising:

receiving a first control message indicating a configured grant configuration, the configured grant configuration comprising a plurality of uplink transmission occasions within a time period;

receiving a second control message indicating a configuration of a measurement gap pattern; and transmitting, using at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that correspond to one or more uplink transmission occasions of the plurality that at least partially overlap with one or more interruption durations associated with a measurement duration, wherein the one or more interruption durations are based at least in part on the measurement gap pattern.

11. The method of claim 10, further comprising:

transmitting one or more acknowledgment or negative acknowledgment messages in accordance with an identifier, the identifier is based at least in part on a first uplink shared channel occasion corresponding to a first uplink transmission occasion of the plurality of uplink transmission occasions, wherein the identifier is further based at least in part on the quantity of unused uplink transmission occasions excluded from the indication.

12. The method of claim 10, wherein the one or more interruption durations comprise one or more visible interruption lengths associated with a network controlled small gap.

13. The method of claim 10, wherein the uplink control information message is multiplexed with each of one or more uplink shared channel messages that are transmitted during one or more valid uplink transmission occasions.

14. The method of claim 11, wherein the one or more interruption durations are associated with inter-band measurements or intra-band measurement in a time division duplexing band.

15. The method of claim 10, further comprising:

determining to exclude the one or more invalid uplink transmission occasions based at least in part on a collision of the one or more uplink transmission occasions with the one or more interruption durations, and wherein the measurement duration corresponds to a synchronization signal measurement timing configuration (SMTC) window.

16. The method of claim 10, wherein the one or more uplink transmission occasions partially overlap or completely overlap with the one or more interruption durations in a time domain.

17. The method of claim 10, wherein the uplink control information message comprises a bitmap indicating exclusion of the one or more invalid uplink transmission occasions.

18. A non-transitory computer-readable medium storing code for wireless communication, the code comprising instructions executable by one or more processors to:

receive a first control message indicating a configured grant configuration, the configured grant configuration comprising a plurality of uplink transmission occasions within a time period;

receive a second control message indicating a configuration of a measurement gap pattern; and transmit, using at least one of the plurality of uplink transmission occasions in accordance with the configured grant configuration, an uplink control information message comprising an indication of a quantity of unused uplink transmission occasions of the plurality of uplink transmission occasions, wherein the indication excludes one or more invalid uplink transmission occasions that correspond to one or more uplink transmission occasions of the plurality that at least partially overlap with one or more interruption durations associated with a measurement duration, wherein the one or more interruption durations are based at least in part on the measurement gap pattern.

* * * * *